(12) United States Patent
Trainoff

(10) Patent No.: US 12,188,910 B2
(45) Date of Patent: *Jan. 7, 2025

(54) REGULATING A DETECTOR FLOW OF A FIELD FLOW FRACTIONATOR

(71) Applicant: Wyatt Technology, LLC, Goleta, CA (US)

(72) Inventor: Steven P. Trainoff, Santa Barbara, CA (US)

(73) Assignee: Wyatt Technology, LLC, Goleta, CA (US)

(*) Notice: Subject to any disclaimer, the term of this patent is extended or adjusted under 35 U.S.C. 154(b) by 131 days.

This patent is subject to a terminal disclaimer.

(21) Appl. No.: 17/938,924

(22) Filed: Sep. 6, 2022

(65) Prior Publication Data

US 2022/0412927 A1    Dec. 29, 2022

Related U.S. Application Data

(63) Continuation-in-part of application No. 16/876,052, filed on May 16, 2020, now Pat. No. 11,435,209.

(Continued)

(51) Int. Cl.
   *G01N 30/00* (2006.01)
   *G01F 1/661* (2022.01)
   (Continued)

(52) U.S. Cl.
   CPC ......... *G01N 30/0005* (2013.01); *G01F 1/661* (2013.01); *G05D 7/0635* (2013.01); *G05D 16/2013* (2013.01); *G01N 2030/007* (2013.01)

(58) Field of Classification Search
   CPC .............. G05D 7/0635; G05D 16/2013; Y10T 137/7761; G01F 1/661; G01N 30/0005
   (Continued)

(56) References Cited

U.S. PATENT DOCUMENTS 5,283,001 A    2/1994 Gregoli et al.
7,684,899 B2   3/2010 Nath et al.
(Continued)

FOREIGN PATENT DOCUMENTS

WO    2009024303 A1    2/2009

OTHER PUBLICATIONS

Notice of Allowance in U.S. Appl. No. 16/876,052 mailed on Apr. 15, 2022.
(Continued)

*Primary Examiner* — William M McCalister
(74) *Attorney, Agent, or Firm* — Leonard Guzman

(57) ABSTRACT

The present disclosure describes an apparatus, method, and system of regulating a detector flow of a field flow fractionator. In an embodiment, the apparatus includes (1) a detector flow meter, where the detector flow meter is configured to measure a detector flow from the field flow fractionator, (2) a channel pressure meter, where the channel pressure meter is configured to measure a channel pressure of the field flow fractionator, (3) at least one control valve, where an inlet of the at least one control valve is connected to an outlet of the channel pressure meter, (4) where the detector flow meter is configured to set a channel pressure set point of the channel pressure meter, and (5) where the channel pressure meter is configured to actuate the at least one control valve to maintain a channel pressure of the field flow fractionator at the channel pressure set point.

20 Claims, 17 Drawing Sheets

Related U.S. Application Data

(60) Provisional application No. 62/848,593, filed on May 16, 2019.

(51) Int. Cl.
   *G05D 7/06* (2006.01)
   *G05D 16/20* (2006.01)

(58) Field of Classification Search
   USPC .................................................. 137/487.5
   See application file for complete search history.

(56) References Cited

U.S. PATENT DOCUMENTS

| | | | |
|---|---|---|---|
| 8,069,655 | B2 | 12/2011 | Carroll, III et al. |
| 9,897,577 | B2* | 2/2018 | Klein ..................... G01N 30/32 |
| 10,132,782 | B2 | 11/2018 | Welz et al. |
| 10,894,929 | B1 | 1/2021 | Mohammad et al. |
| 2008/0022765 | A1 | 1/2008 | Witt et al. |
| 2012/0036890 | A1 | 2/2012 | Kimble et al. |
| 2013/0213858 | A1 | 8/2013 | Etter |
| 2016/0011155 | A1 | 1/2016 | Klein |
| 2016/0096159 | A1 | 4/2016 | Black |
| 2016/0238571 | A1* | 8/2016 | Welz ..................... B01D 11/04 |
| 2019/0292469 | A1 | 9/2019 | Banerjee |

OTHER PUBLICATIONS

International Search Report and Written Opinion in PCT/US2021/032652 mailed on Aug. 30, 2021.

Johann, Christoph, et al., "A novel approach to improve operation and performance in flow field-flow fractionation", Journal of Chromatography A, Jul. 1, 2011, vol. 1218, No. 27, pp. 4126-4131.

Extended European Search Report in EP Application No. 21809057.9 mailed on May 27, 2024.

International Preliminary Report on Patentability in PCT/US2021/032652 mailed on Dec. 1, 2022.

* cited by examiner

REGULATING A DETECTOR FLOW OF A FIELD FLOW FRACTIONATOR

PRIORITY

This application is a continuation-in-part of U.S. patent application Ser. No. 16/876,052, filed May 16, 2020, and claims priority to U.S. Provisional Patent Application No. 62/848,593, filed May 16, 2019.

BACKGROUND

The present disclosure relates to field flow fractionators, and more specifically, to regulating a detector flow of a field flow fractionator.

SUMMARY

The present disclosure describes an apparatus, a computer implemented method, and a system of regulating a detector flow of a field flow fractionator. In an exemplary embodiment, the apparatus includes (1) a detector flow meter, where an inlet of the detector flow meter is configured to be connected to an outlet of a detector port of a field flow fractionator, where an outlet of the detector flow meter is configured to be connected to an inlet of a detector chain comprising at least one detector, where the detector flow meter is configured to measure a detector flow from the field flow fractionator, (2) a channel pressure meter, where an inlet of the channel pressure meter is configured to be connected to an outlet of a split port of the field flow fractionator, where the channel pressure meter is configured to measure a channel pressure of the field flow fractionator, (3) at least one control valve, where an inlet of the at least one control valve is connected to an outlet of the channel pressure meter, (4) where the detector flow meter is configured to set a channel pressure set point of the channel pressure meter to maintain the detector flow from the detector port at a particular flow rate, and (5) where the channel pressure meter is configured to actuate the at least one control valve to maintain a channel pressure of the field flow fractionator at the channel pressure set point.

DETAILED DESCRIPTION

Figure 1A:
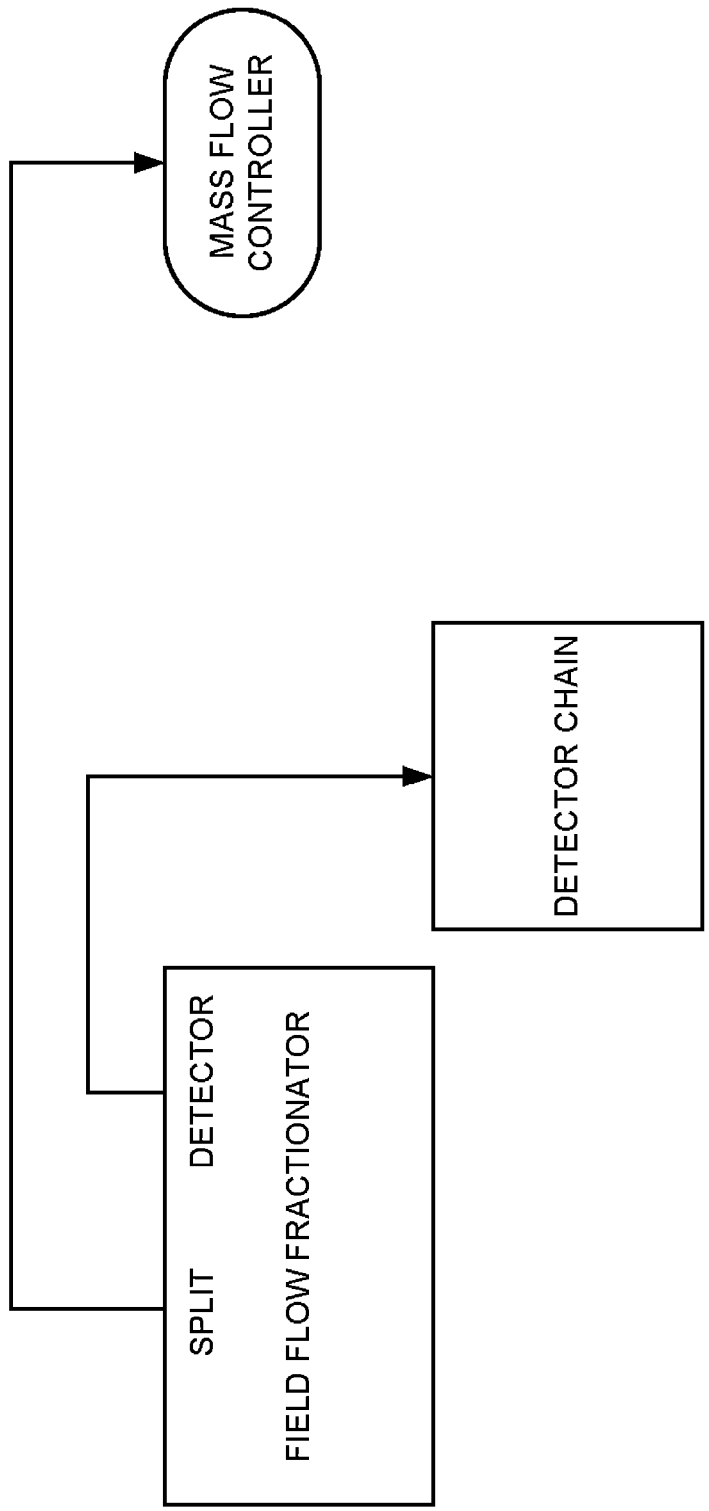
FIG. 1A depicts an existing field flow fractionator with a mass flow controller.

The present disclosure describes an apparatus, a computer implemented method, and a system of regulating a detector flow of a field flow fractionator. In an exemplary embodiment, the apparatus includes (1) a detector flow meter, where an inlet of the detector flow meter is configured to be connected to an outlet of a detector port of a field flow fractionator, where an outlet of the detector flow meter is configured to be connected to an inlet of a detector chain comprising at least one detector, where the detector flow meter is configured to measure a detector flow from the field flow fractionator, (2) a channel pressure meter, where an inlet of the channel pressure meter is configured to be connected to an outlet of a split port of the field flow fractionator, where the channel pressure meter is configured to measure a channel pressure of the field flow fractionator, (3) at least one control valve, where an inlet of the at least one control valve is connected to an outlet of the channel pressure meter, (4) where the detector flow meter is configured to set a channel pressure set point of the channel pressure meter to maintain the detector flow from the detector port at a particular flow rate, and (5) where the channel pressure meter is configured to actuate the at least one control valve to maintain a channel pressure of the field flow fractionator at the channel pressure set point. In an embodiment, the at least one detector is one of a light scattering instrument, a viscometer, a refractometer, an ultraviolet-visible absorption detector, an infrared absorption detector, an evaporative light scattering detector, a Raman spectroscopy detector, an inductively coupled plasma mass spectrometry, a fluorescence detector, a conductivity detector, and a pH detector. In a particular embodiment, the light scattering instrument is one of a static light scattering instrument and a dynamic light scattering instrument. In an embodiment, the field flow fractionator (FFF) is at least one of an asymmetric flow FFF system, a gravitational FFF system, a centrifugal FFF system, a thermal-gradient FFF system, an electrical FFF system, a magnetic FFF system, a flow FFF system, a hollow fiber FFF system, and a split flow thin-cell fractionation system.

In an embodiment, the computer implemented method and system include (1) receiving, by a computer system, detector flow data from a detector flow meter, where the detector flow meter is configured to measure a detector flow from a field flow fractionator, where an inlet of the detector flow meter is configured to be connected to an outlet of a detector port of the field flow fractionator, where an outlet of the detector flow meter is configured to be connected to an inlet of a detector chain comprising at least one detector, (2) receiving, by the computer system, channel pressure data from a channel pressure meter, where the channel pressure meter is configured to measure a channel pressure of the field flow fractionator, where an inlet of the channel pressure meter is configured to be connected to an outlet of a split port of the field flow fractionator, (3) executing, by the computer system, in response to the received detector flow data, a set of logical operations setting, via the detector flow meter, a channel pressure set point of the channel pressure meter to maintain the detector flow from the detector port at a particular flow rate, and (4) executing, by the computer system, in response to the received channel pressure data, a set of logical operations actuating, via the channel pressure meter, at least one control valve to maintain a channel pressure of the field flow fractionator at the channel pressure set point, where an inlet of the at least one control valve is connected to an outlet of the channel pressure meter.

DEFINITIONS

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photodetector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Viscometer

A capillary bridge viscometer (VIS) is an instrument used to measure the specific viscosity of a solute in a suitable solvent. The specific viscosity is defined as $\eta_{sp}=\eta/\eta_o-1$, where n is the viscosity of the sample and $\eta_o$ is the viscosity of the solvent. As a sample is introduced into the bridge viscometer, a pressure transducer generates a signal indicative of a pressure differential. This pressure differential, combined with a predetermined internal pressure of the system, is used to calculate the specific viscosity of the sample. The specific viscosity is useful in determining the molecular parameters of a polymer including molar mass and hydrodynamic radius.

The differential pressure transducer in a capillary bridge viscometer measures the differential pressure generated across fluid arms. The instrument measures the differential pressure values continuously while flowing fluid through the system. When pure solvent flows through the system and the bridge is balanced, the differential pressure measured should be zero. Impurities in the solvent, undissolved air bubbles, electrical noise, or micro leaks in the plumbing could cause undesired noise in the differential pressure measurement, which ultimately is used to determine the specific viscosity.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A=-\log(\%T/100\%).$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

Current Technologies

Figure 1B:
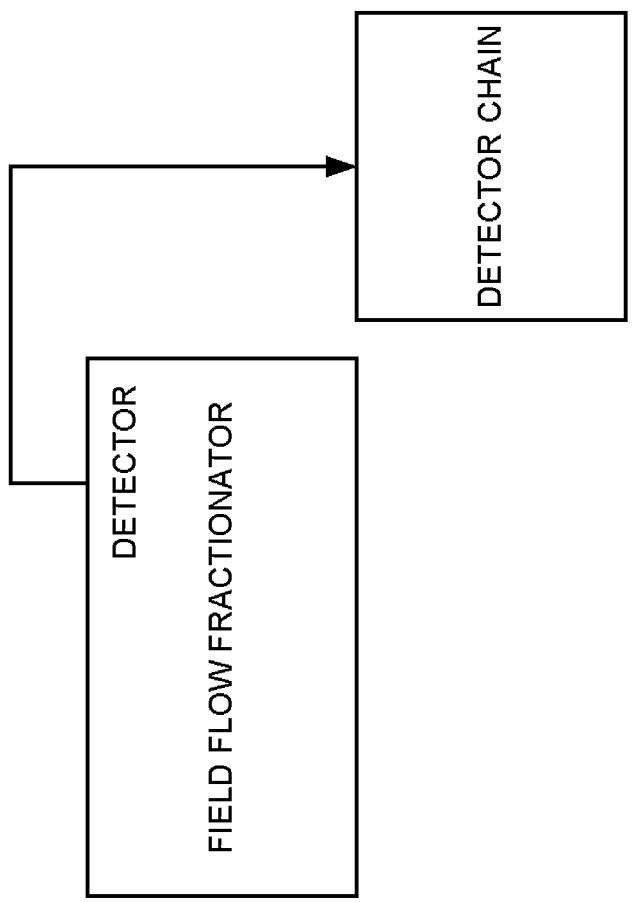
FIG. 1B depicts an existing field flow fractionator/dilution control channel with no split port.

Current technologies, as depicted in FIG. 1A and FIG. 1B infer the detector flow from a FFF from other flows from the FFF, assumes that the volume of the channel of the FFF is constant during the run of a sample through the FFF, and do not measure the recovered mass if any of the sample remains trapped on the membrane of the FFF. There is a need to regulating a detector flow of a field flow fractionator.

Figure 2A:
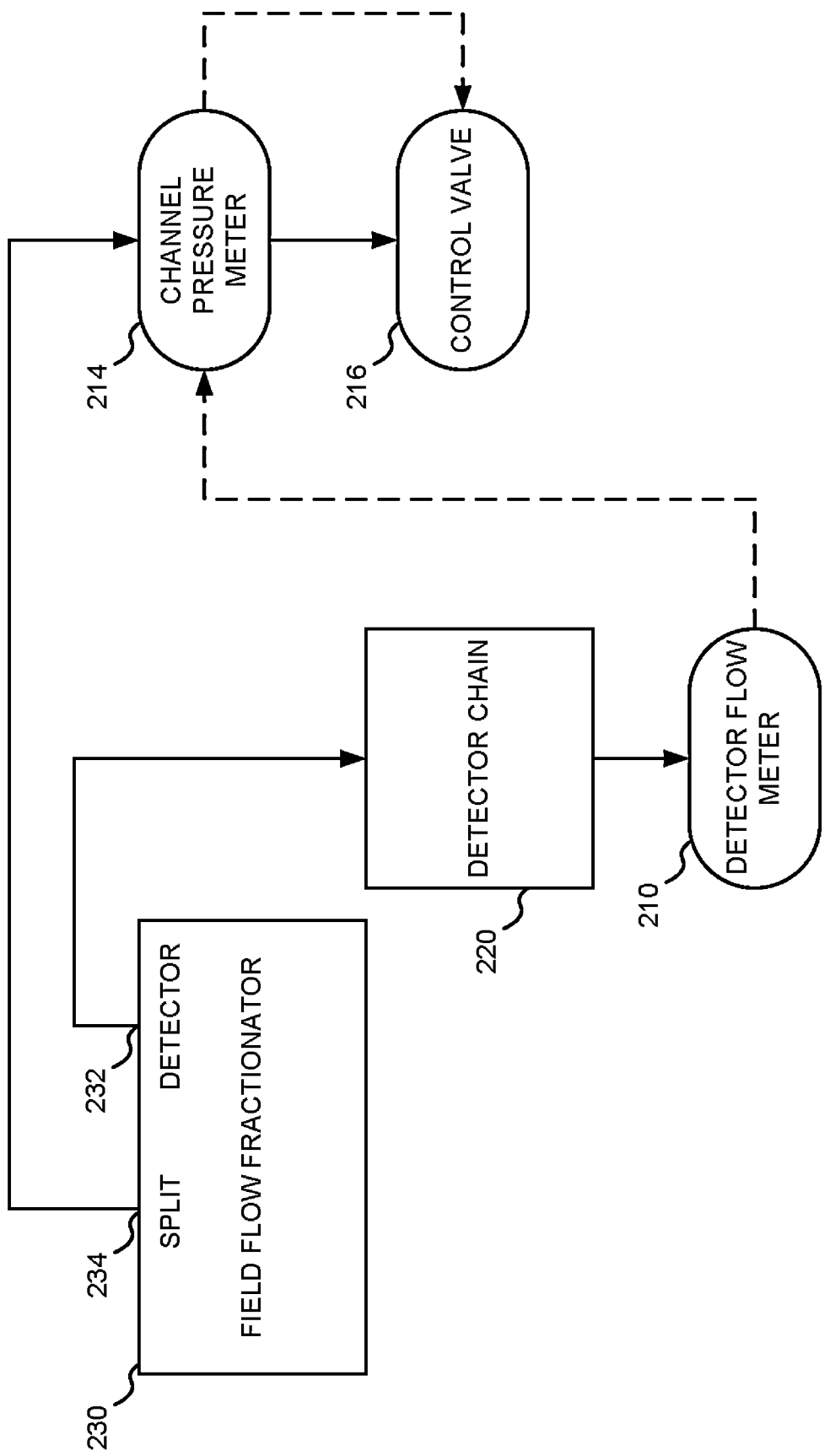
FIG. 2A depicts an apparatus in accordance with an exemplary embodiment.

Referring to FIG. 2A, in an exemplary embodiment, the apparatus includes (1) a detector flow meter 210, where an inlet of detector flow meter 210 is configured to be connected to an outlet of a detector chain 220 including at least one detector, where an inlet of detector chain 220 is connected to the outlet of a detector port 232 of a field flow fractionator 230, where detector flow meter 210 is configured to measure a detector flow from field flow fractionator 230, (2) a channel pressure meter 214, where an inlet of channel pressure meter 214 is configured to be connected to an outlet of a split port 234 of field flow fractionator 230, where channel pressure meter 214 is configured to measure a channel pressure of field flow fractionator 230, (3) at least one control valve 216, where an inlet of at least one control valve 216 is connected to an outlet of channel pressure meter 214, (4) where detector flow meter 210 is configured to set a channel pressure set point of channel pressure meter 214 to maintain the detector flow from detector port 232 at a particular flow rate, and (5) where channel pressure meter 214 is configured to actuate at least one control valve 216 to maintain a channel pressure of field flow fractionator 230 at the channel pressure set point. In an embodiment, the particular flow rate is a constant flow rate.

In an embodiment, channel pressure meter 214 is configured to actuate at least one control valve 216 to maintain the detector flow at the particular flow rate at a set time. In a particular embodiment, channel pressure meter 214 is configured to actuate at least one control valve 216 towards a closed state to increase the channel pressure, in response to the detector flow being less than the particular flow rate, and channel pressure meter 214 is configured to actuate at least one control valve 216 towards an open state to decrease the channel pressure, in response to the detector flow being greater than the particular flow rate. In an embodiment, channel pressure meter 214 is configured to actuate at least one control valve 216 towards a closed state to increase the channel pressure, and channel pressure meter 214 is configured to actuate at least one control valve 216 towards an open state to decrease the channel pressure.

Figure 2B:
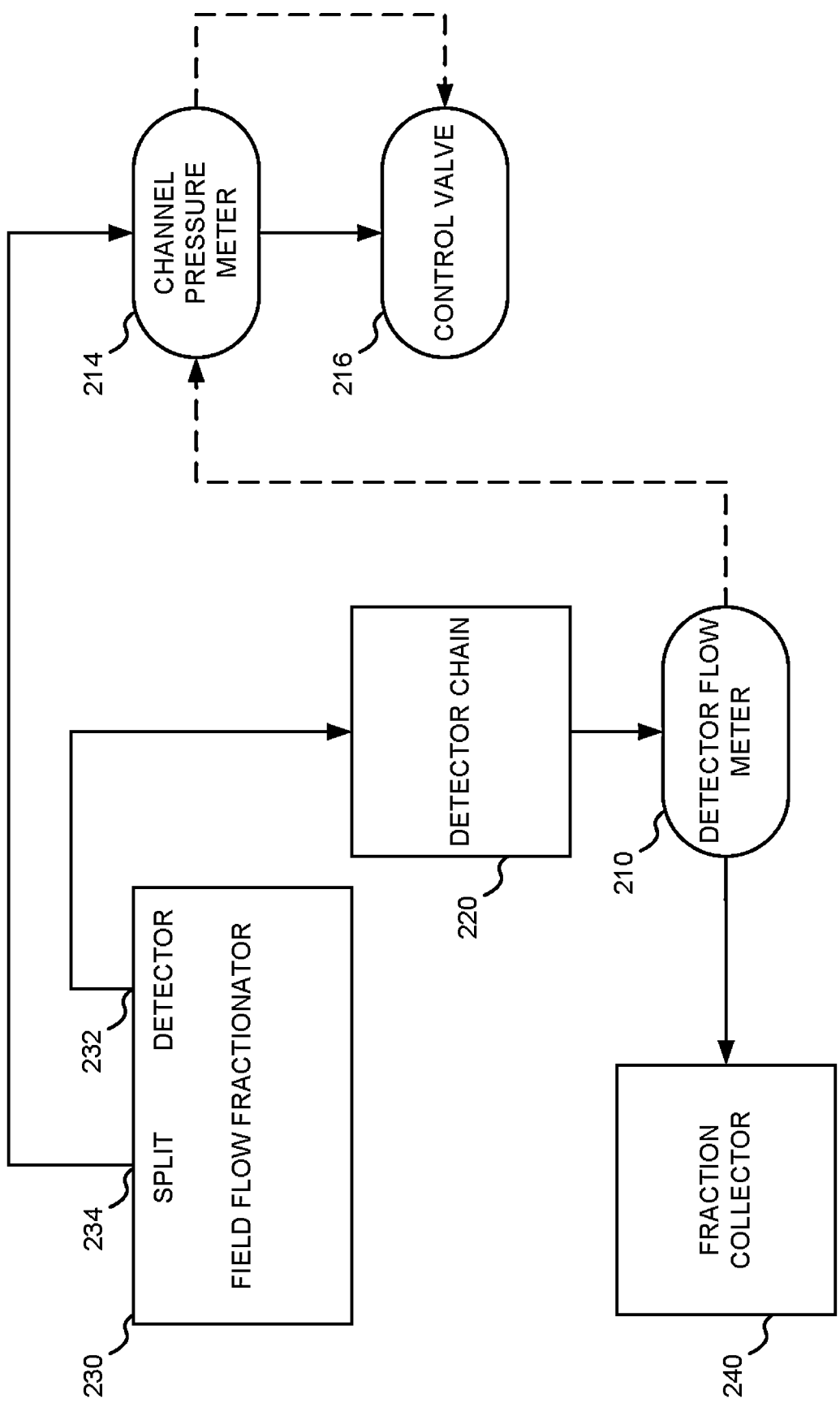
FIG. 2B depicts an apparatus in accordance with an embodiment.
Figure 2C:
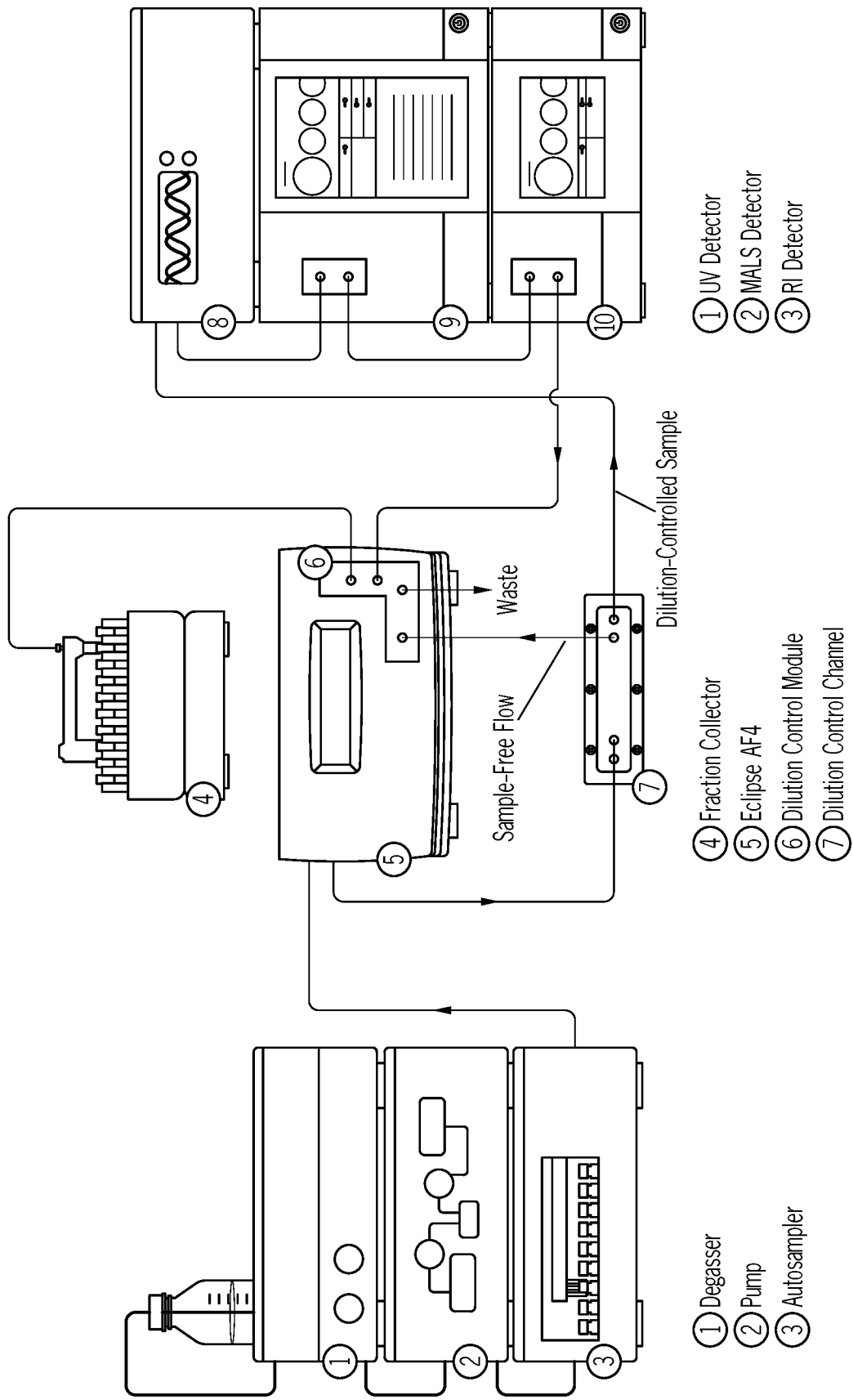
FIG. 2C depicts a field flow fractionator/dilution control channel in accordance with an exemplary embodiment.

Referring to FIG. 2B, in an embodiment, an outlet of detector flow meter 210 is configured to be connected to a fraction collector 240. FIG. 2C depicts a field flow fractionator/dilution control channel with detector port and split port, where the disclosed apparatus is implemented in the dilution control module.

Figure 3:
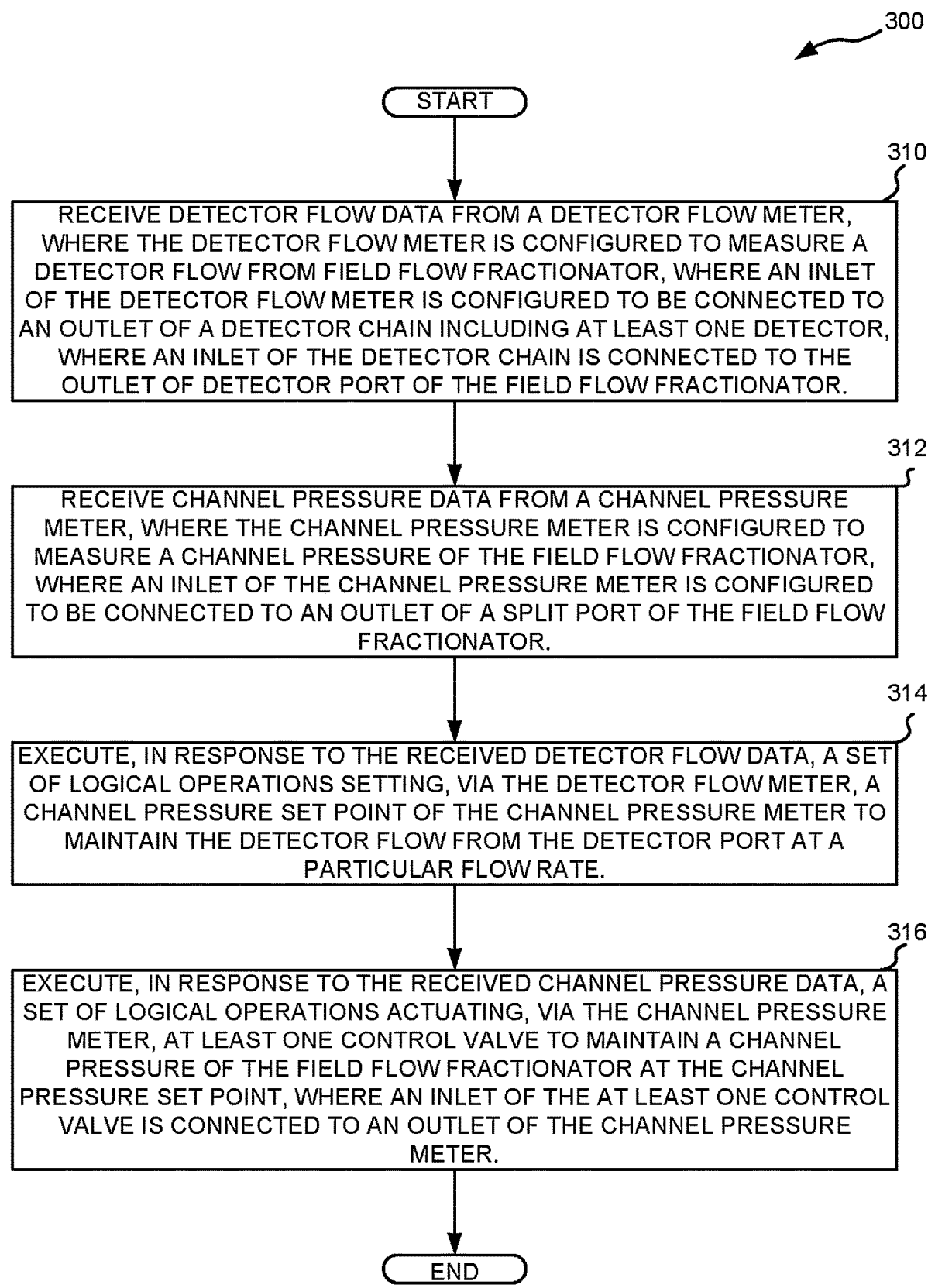
FIG. 3 depicts a flowchart in accordance with an exemplary embodiment.
Figure 4A:
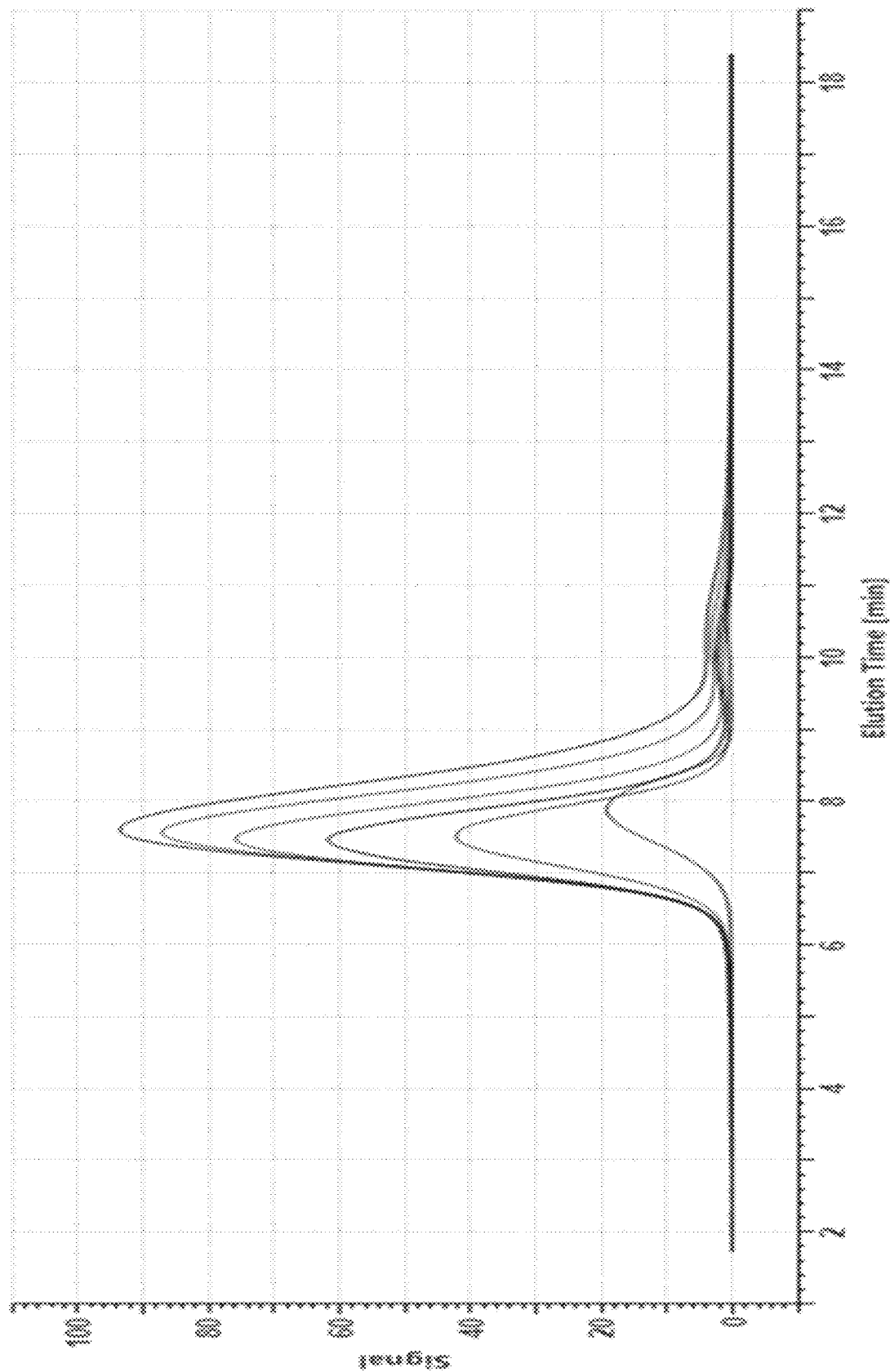
FIG. 4A depicts a graph in accordance with an embodiment.
Figure 4B:
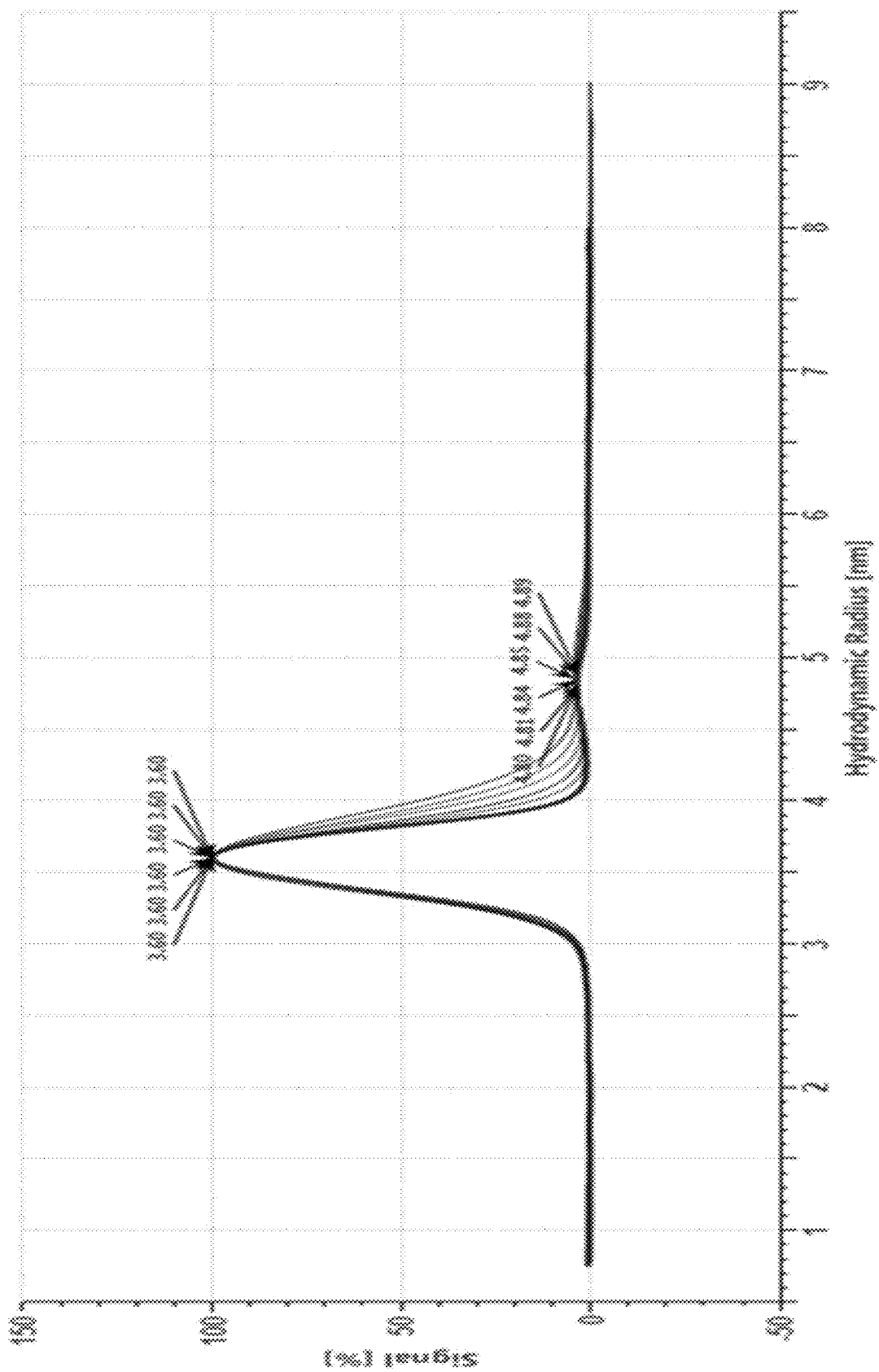
FIG. 4B depicts a graph in accordance with an embodiment.

Referring to FIG. 3, in an exemplary embodiment, the computer implemented method and system are configured to perform an operation 310 of receiving, by a computer system, detector flow data from a detector flow meter, where the detector flow meter is configured to measure a detector flow from field flow fractionator, where an inlet of the detector flow meter is configured to be connected to an outlet of a detector chain including at least one detector, where an inlet of the detector chain is connected to the outlet of detector port of the field flow fractionator, an operation 312 of receiving, by the computer system, channel pressure data from a channel pressure meter, where the channel pressure meter is configured to measure a channel pressure of the field flow fractionator, where an inlet of the channel pressure meter is configured to be connected to an outlet of a split port of the field flow fractionator, an operation 314 of executing, by the computer system, in response to the received detector flow data, a set of logical operations setting, via the detector flow meter, a channel pressure set point of the channel pressure meter to maintain the detector flow from the detector port at a particular flow rate, and an operation 316 of executing, by the computer system, in response to the received channel pressure data, a set of logical operations actuating, via the channel pressure meter, at least one control valve to maintain a channel pressure of the field flow fractionator at the channel pressure set point, where an inlet of the at least one control valve is connected to an outlet of the channel pressure meter. In an embodiment, actuating operation 316 includes actuating, via the channel pressure meter, the at least one control valve to maintain the detector flow at the particular flow rate at a set time. In a particular embodiment, actuating operation 316 includes actuating, via the channel pressure meter, the at least one control valve towards a closed state to increase the channel pressure, in response to the detector flow being less than the particular flow rate, and actuating operation 316 includes actuating, via the channel pressure meter, the at least one control valve towards an open state to decrease the channel pressure, in response to the detector flow being greater than the particular flow rate. In an embodiment, actuating operation 316 includes actuating, via the channel pressure meter, the at least one control valve towards a closed state to increase the channel pressure, and actuating operation 316 includes actuating, via the channel pressure meter, the at least one control valve towards an open state to decrease the channel pressure.

Figure 8:
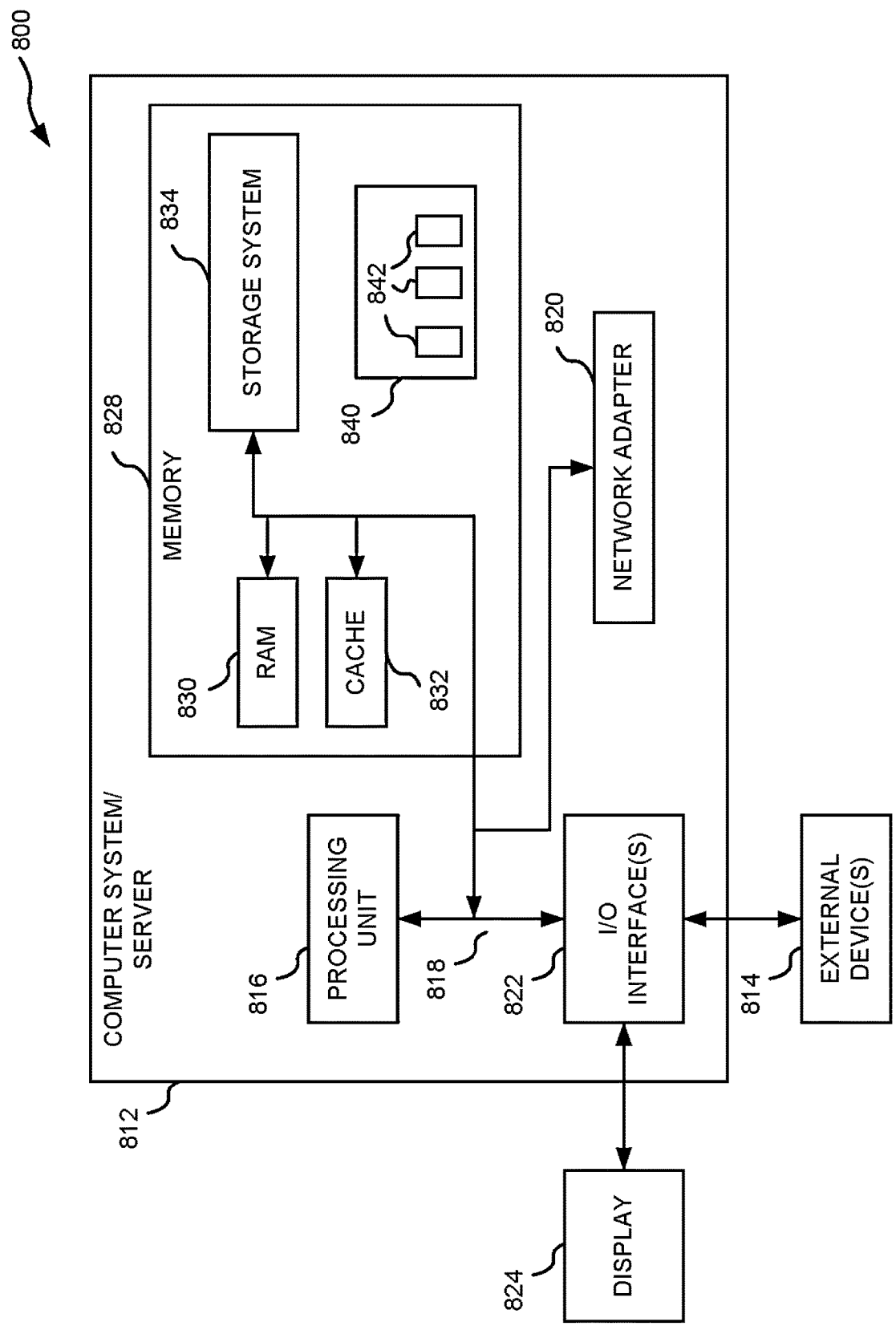
FIG. 8 depicts a computer system in accordance with an exemplary embodiment.

In an exemplary embodiment, the computer system is a standalone computer system, such as computer system 800 shown in FIG. 8, a network of distributed computers, where at least some of the computers are computer systems such as computer system 800 shown in FIG. 8, or a cloud computing node server, such as computer system 800 shown in FIG. 8. In an embodiment, the computer system is a computer system 800 as shown in FIG. 8, that executes an analyzing data collected by analytical instruments script or computer software application that carries out the operations of at least method 300. In an embodiment, the computer system is a computer system/server 812 as shown in FIG. 8, that executes an analyzing data collected by analytical instruments script or computer software application that carries out the operations of at least method 300. In an embodiment, the computer system is a processing unit 816 as shown in FIG. 8, that executes an analyzing data collected by analytical instruments script or computer software application that carries out the operations of at least method 300. In an embodiment, the computer system is a processor of the analytical instrument, that executes an analyzing data collected by analytical instruments script or computer software application that carries out the operations of at least method 300.

In an embodiment, the computer system is a computer system 800 as shown in FIG. 8, that executes a regulating a detector flow of a field flow fractionator script or computer software application that carries out at least operations 310, 312, 314, and 316. In an embodiment, the computer system is a computer system/server 812 as shown in FIG. 8, that executes a regulating a detector flow of a field flow fractionator script or computer software application that carries out at least operations 310, 312, 314, and 316. In an embodiment, the computer system is a processing unit 816 as shown in FIG. 8, that executes a regulating a detector flow of a field flow fractionator script or computer software application that carries out at least operations 310, 312, 314, and 316. In an embodiment, the computer system is a processor of a dilution control module, that executes a regulating a detector flow of a field flow fractionator script or computer software application that carries out at least operations 310, 312, 314, and 316.

Figure 9A:
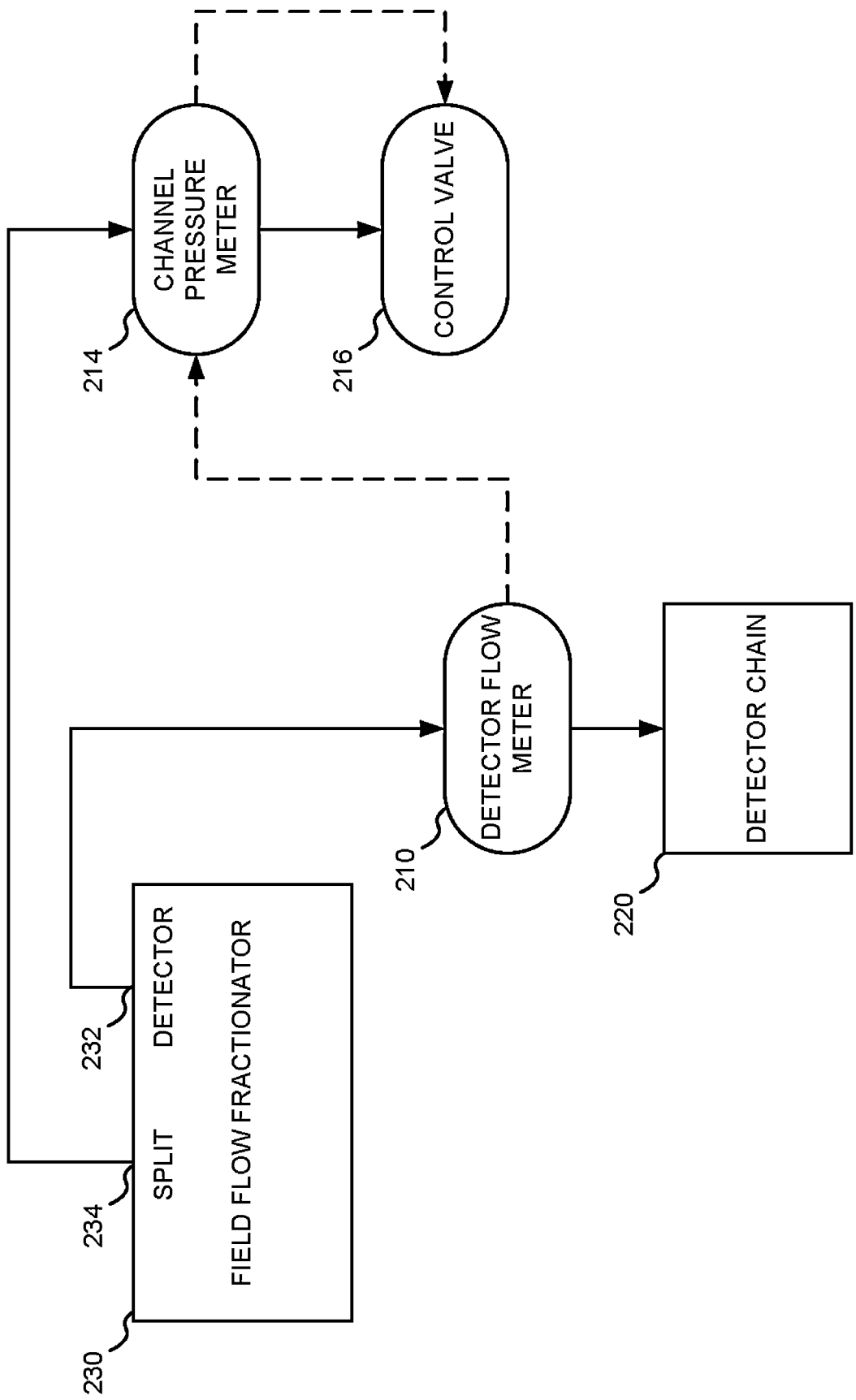
FIG. 9A depicts an apparatus in accordance with an exemplary embodiment.

Referring to FIG. 9A, in an exemplary embodiment, the apparatus includes (1) a detector flow meter 210, where an inlet of detector flow meter 210 is configured to be connected to an outlet of a detector port 232 of field flow fractionator 230, where an outlet of detector flow meter 210 is configured to be connected to an inlet of a detector chain 220 including at least one detector, where detector flow meter 210 is configured to measure a detector flow from field flow fractionator 230, (2) a channel pressure meter 214, where an inlet of channel pressure meter 214 is configured to be connected to an outlet of a split port 234 of field flow fractionator 230, where channel pressure meter 214 is configured to measure a channel pressure of field flow fractionator 230, (3) at least one control valve 216, where an inlet of at least one control valve 216 is connected to an outlet of channel pressure meter 214, (4) where detector flow meter 210 is configured to set a channel pressure set point of channel pressure meter 214 to maintain the detector flow from detector port 232 at a particular flow rate, and (5) where channel pressure meter 214 is configured to actuate at least one control valve 216 to maintain a channel pressure of field flow fractionator 230 at the channel pressure set point. In an embodiment, the particular flow rate is a constant flow rate.

Figure 9B:
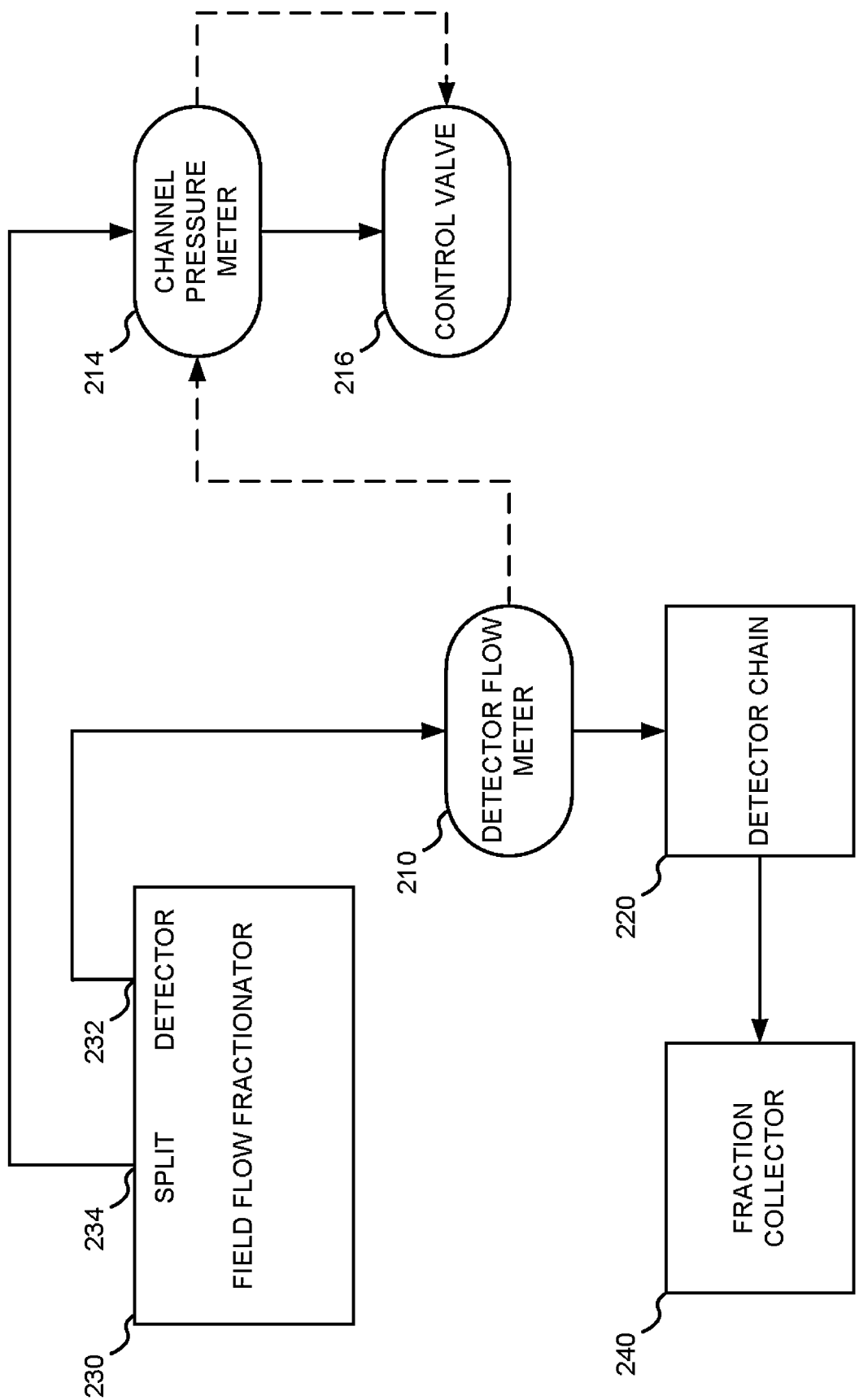
FIG. 9B depicts an apparatus in accordance with an embodiment.

In an embodiment, channel pressure meter 214 is configured to actuate at least one control valve 216 to maintain the detector flow at the particular flow rate at a set time. In a particular embodiment, channel pressure meter 214 is configured to actuate at least one control valve 216 towards a closed state to increase the channel pressure, in response to the detector flow being less than the particular flow rate, and channel pressure meter 214 is configured to actuate at least one control valve 216 towards an open state to decrease the channel pressure, in response to the detector flow being greater than the particular flow rate. In an embodiment, channel pressure meter 214 is configured to actuate at least one control valve 216 towards a closed state to increase the channel pressure, and channel pressure meter 214 is configured to actuate at least one control valve 216 towards an open state to decrease the channel pressure. Referring to FIG. 9B, in an embodiment, an outlet of detector chain 220 is configured to be connected to a fraction collector 240.

Figure 10:
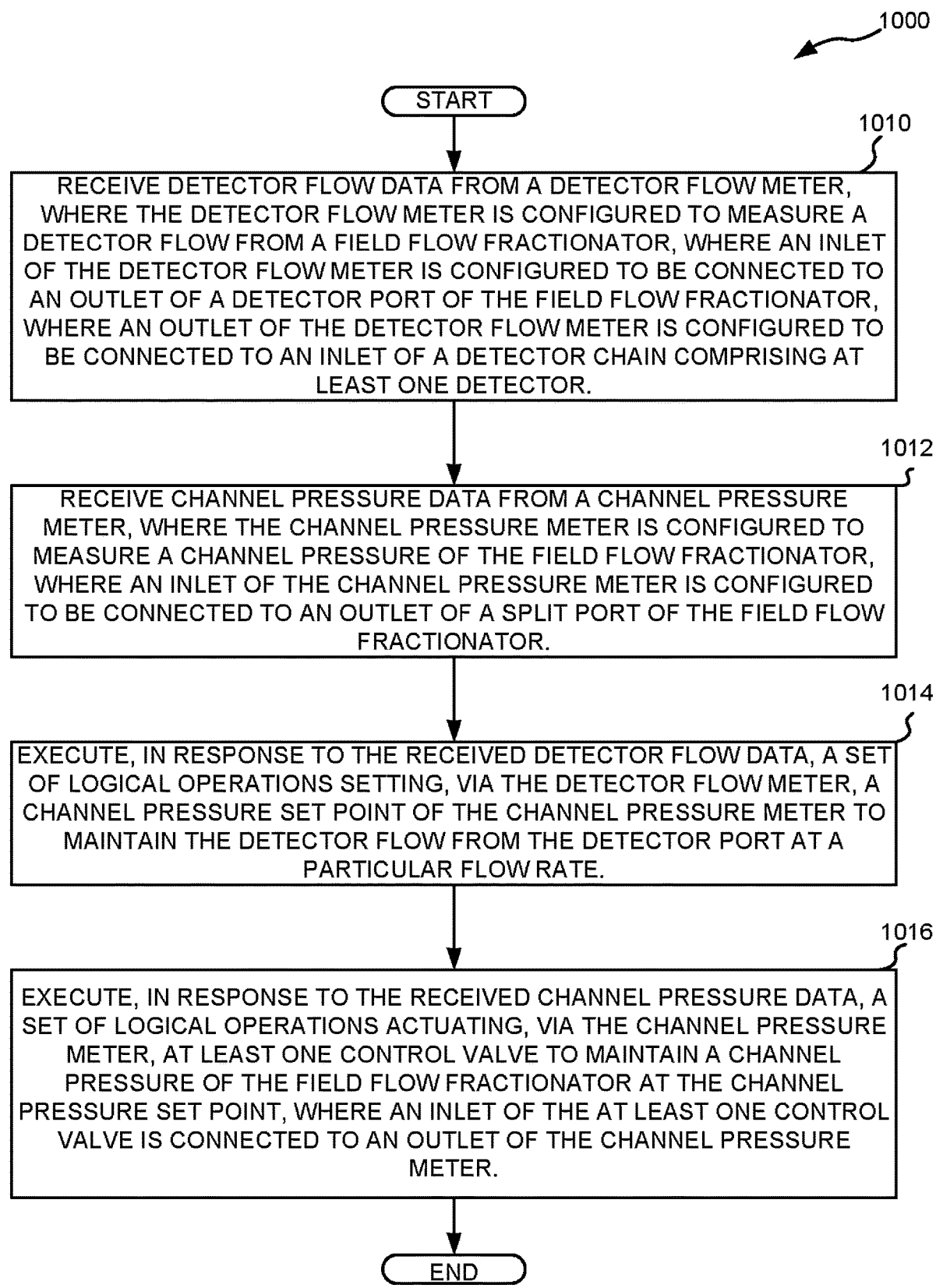
FIG. 10 depicts a flowchart in accordance with an exemplary embodiment.

Referring to FIG. 10, in an exemplary embodiment, the computer implemented method and system are configured to perform an operation 1010 of receiving, by a computer system, detector flow data from a detector flow meter, where the detector flow meter is configured to measure a detector flow from field flow fractionator, where an inlet of the detector flow meter is configured to be connected to an outlet of a detector port of the field flow fractionator, where an outlet of the detector flow meter is configured to be connected to an inlet of a detector chain comprising at least one detector, an operation 1012 of receiving, by the computer system, channel pressure data from a channel pressure meter, where the channel pressure meter is configured to measure a channel pressure of the field flow fractionator, where an inlet of the channel pressure meter is configured to be connected to an outlet of a split port of the field flow fractionator, an operation 1014 of executing, by the computer system, in response to the received detector flow data, a set of logical operations setting, via the detector flow meter, a channel pressure set point of the channel pressure meter to maintain the detector flow from the detector port at a particular flow rate, and an operation 1016 of executing, by the computer system, in response to the received channel pressure data, a set of logical operations actuating, via the channel pressure meter, at least one control valve to maintain a channel pressure of the field flow fractionator at the channel pressure set point, where an inlet of the at least one control valve is connected to an outlet of the channel pressure meter. In an embodiment, actuating operation 1016 includes actuating, via the channel pressure meter, the at least one control valve to maintain the detector flow at the particular flow rate at a set time. In a particular embodiment, actuating operation 1016 includes actuating, via the channel pressure meter, the at least one control valve towards a closed state to increase the channel pressure, in response to the detector flow being less than the particular flow rate, and actuating operation 1016 includes actuating, via the channel pressure meter, the at least one control valve towards an open state to decrease the channel pressure, in response to the detector flow being greater than the particular flow rate. In an embodiment, actuating operation 1016 includes actuating, via the channel pressure meter, the at least one control valve towards a closed state to increase the channel pressure, and actuating operation 1016 includes actuating, via the channel pressure meter, the at least one control valve towards an open state to decrease the channel pressure.

In an embodiment, the computer system is a computer system 800 as shown in FIG. 8, that executes an analyzing data collected by analytical instruments script or computer software application that carries out the operations of at least method 1000. In an embodiment, the computer system is a computer system/server 812 as shown in FIG. 8, that executes an analyzing data collected by analytical instruments script or computer software application that carries out the operations of at least method 1000. In an embodiment, the computer system is a processing unit 816 as shown in FIG. 8, that executes an analyzing data collected by analytical instruments script or computer software application that carries out the operations of at least method 1000. In an embodiment, the computer system is a processor of the analytical instrument, that executes an analyzing data collected by analytical instruments script or computer software application that carries out the operations of at least method 1000.

In an embodiment, the computer system is a computer system 800 as shown in FIG. 8, that executes a regulating a detector flow of a field flow fractionator script or computer software application that carries out at least operations 1010, 1012, 1014, and 1016. In an embodiment, the computer system is a computer system/server 812 as shown in FIG. 8, that executes a regulating a detector flow of a field flow fractionator script or computer software application that carries out at least operations 1010, 1012, 1014, and 1016. In an embodiment, the computer system is a processing unit 816 as shown in FIG. 8, that executes a regulating a detector flow of a field flow fractionator script or computer software application that carries out at least operations 1010, 1012, 1014, and 1016. In an embodiment, the computer system is a processor of a dilution control module, that executes a regulating a detector flow of a field flow fractionator script or computer software application that carries out at least operations 1010, 1012, 1014, and 1016.

EXAMPLE

Figure 5:
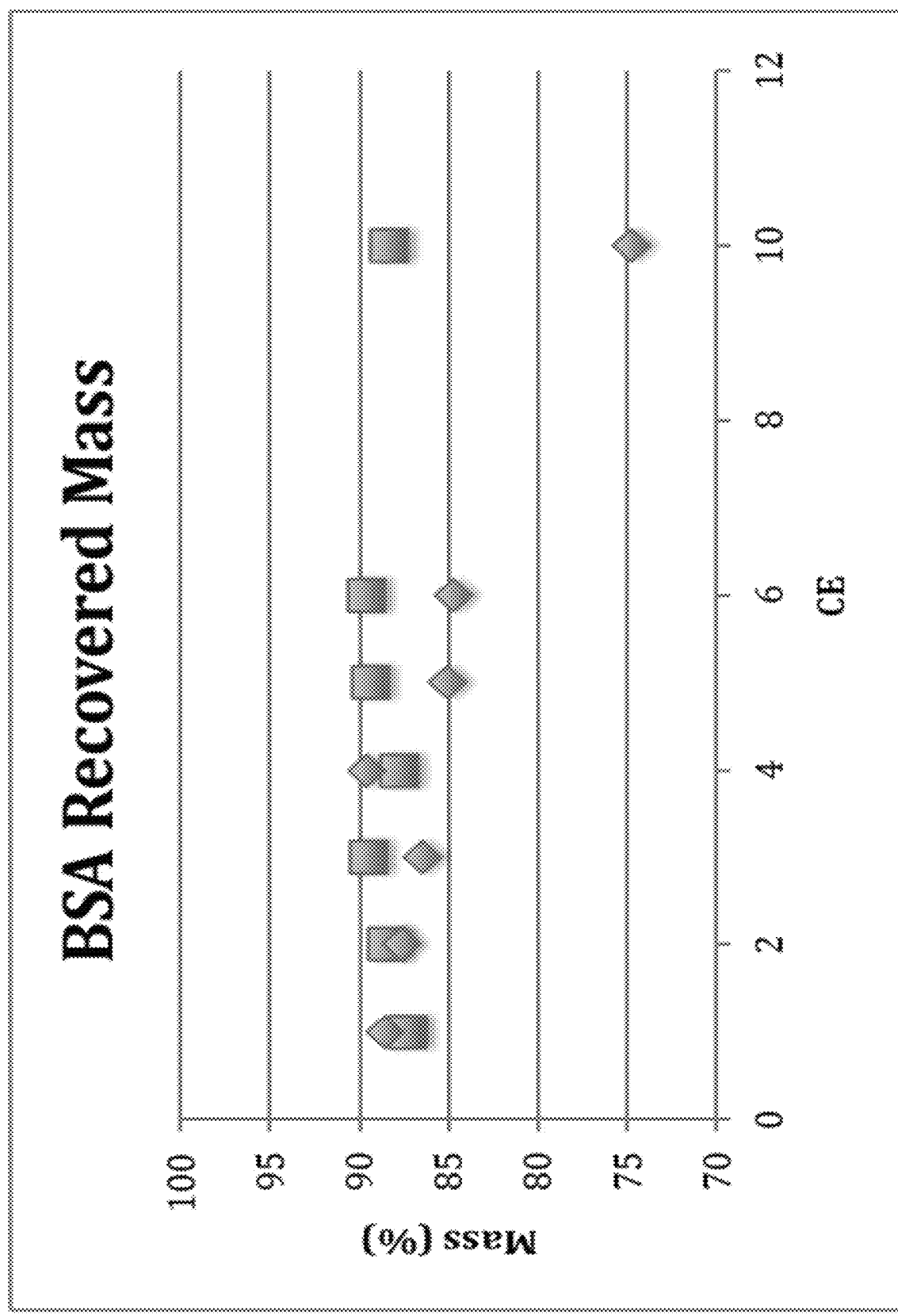
FIG. 5 depicts a graph in accordance with an embodiment.
Figure 6A:
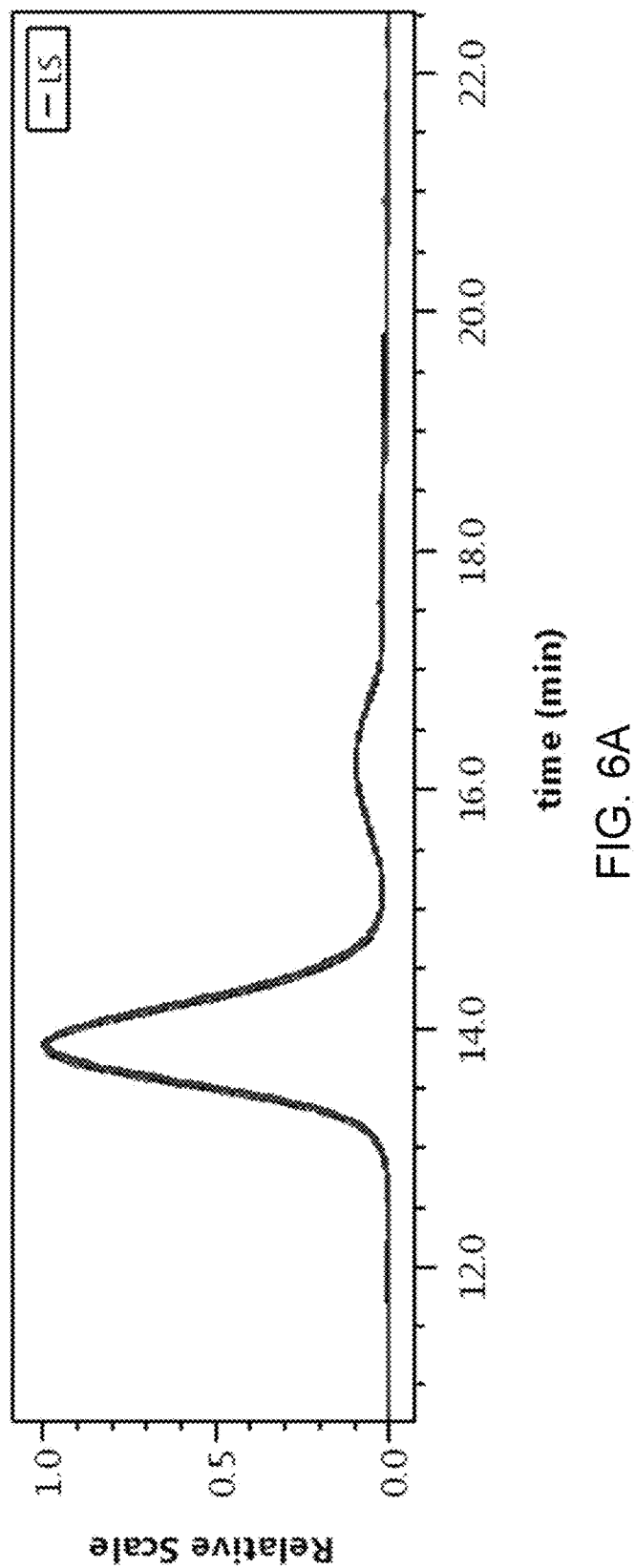
FIG. 6A depicts a graph in accordance with an embodiment.
Figure 6B:
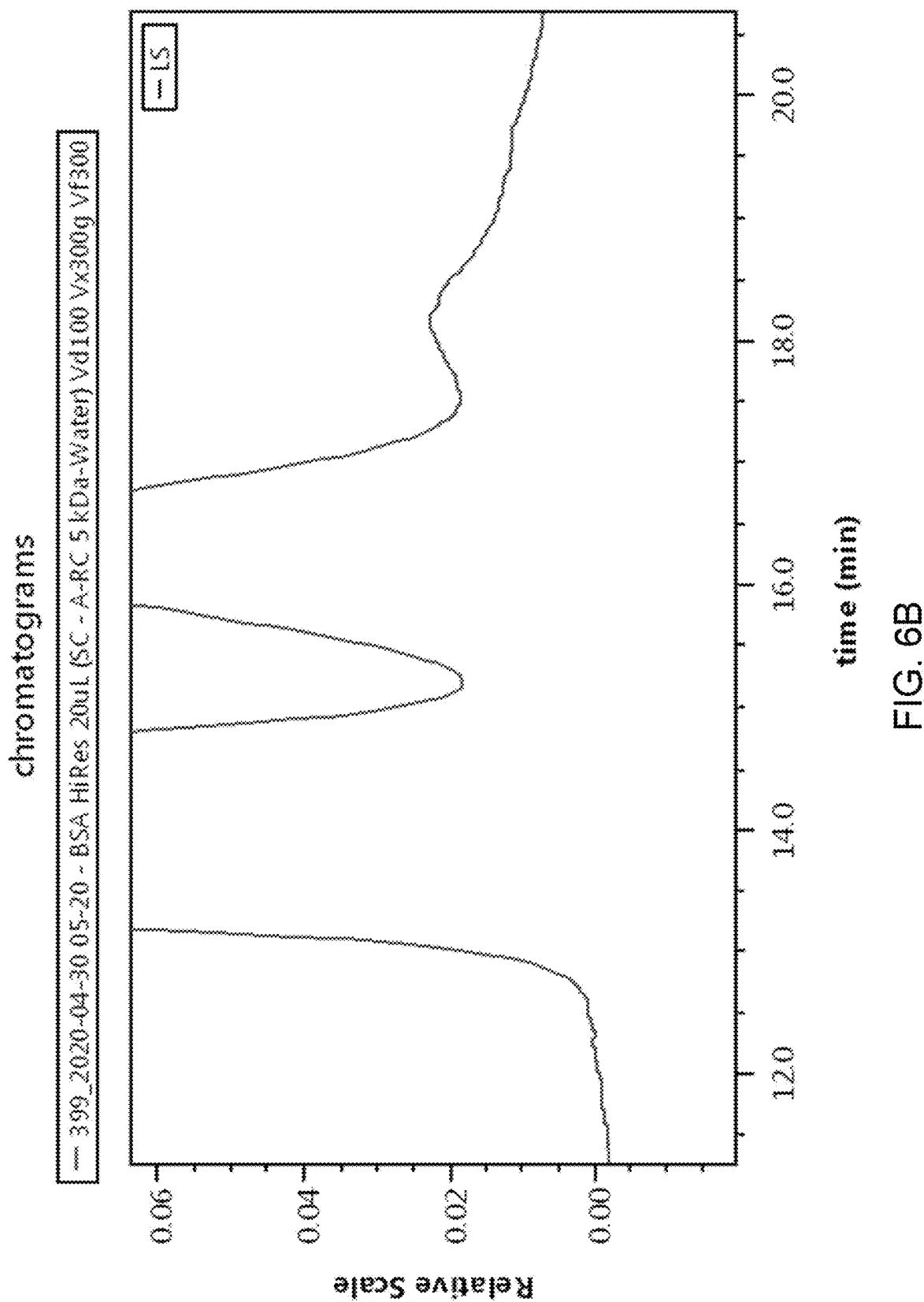
FIG. 6B depicts a graph in accordance with an embodiment.
Figure 7A:
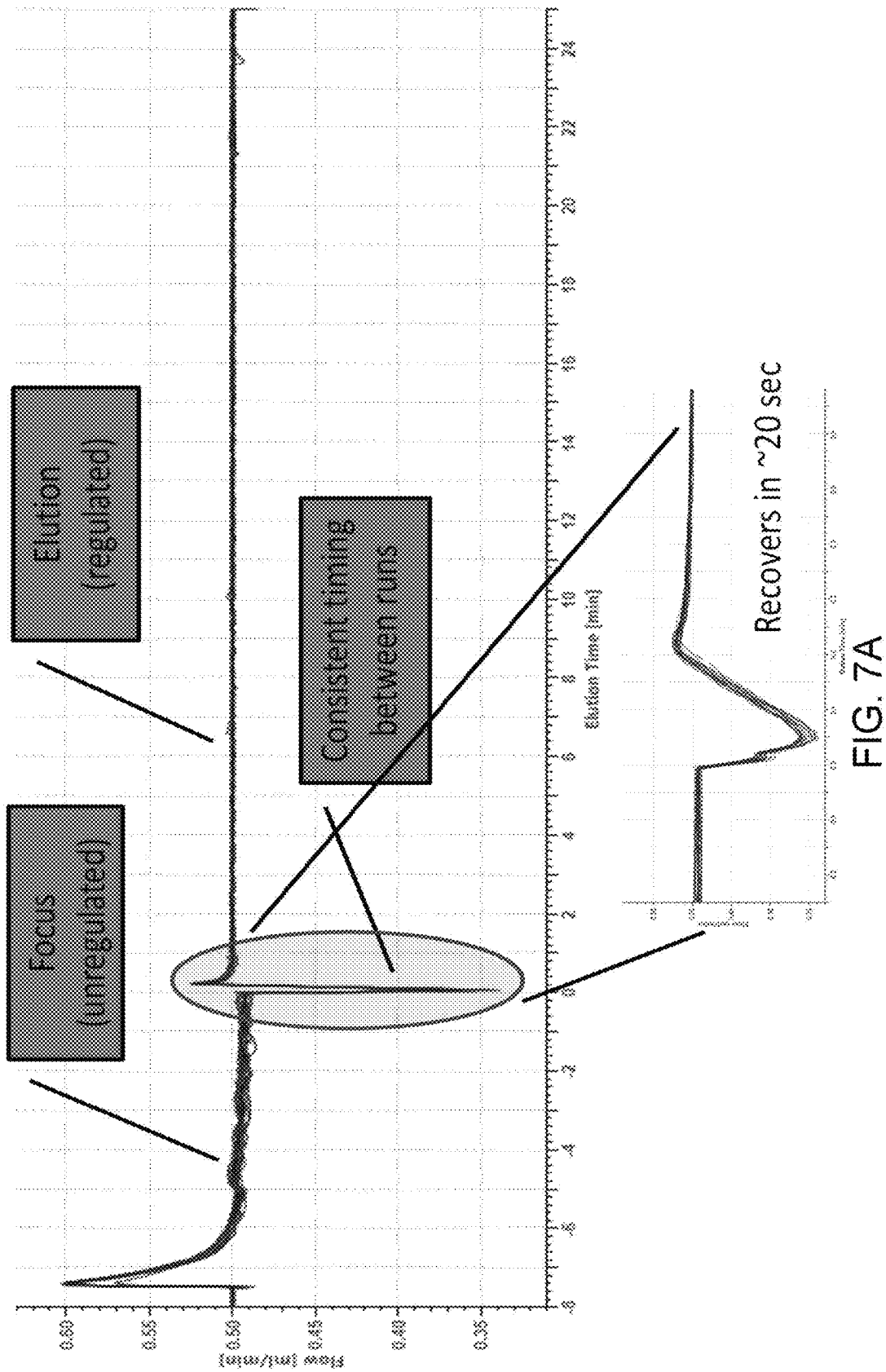
FIG. 7A depicts a graph in accordance with an embodiment.
Figure 7B:
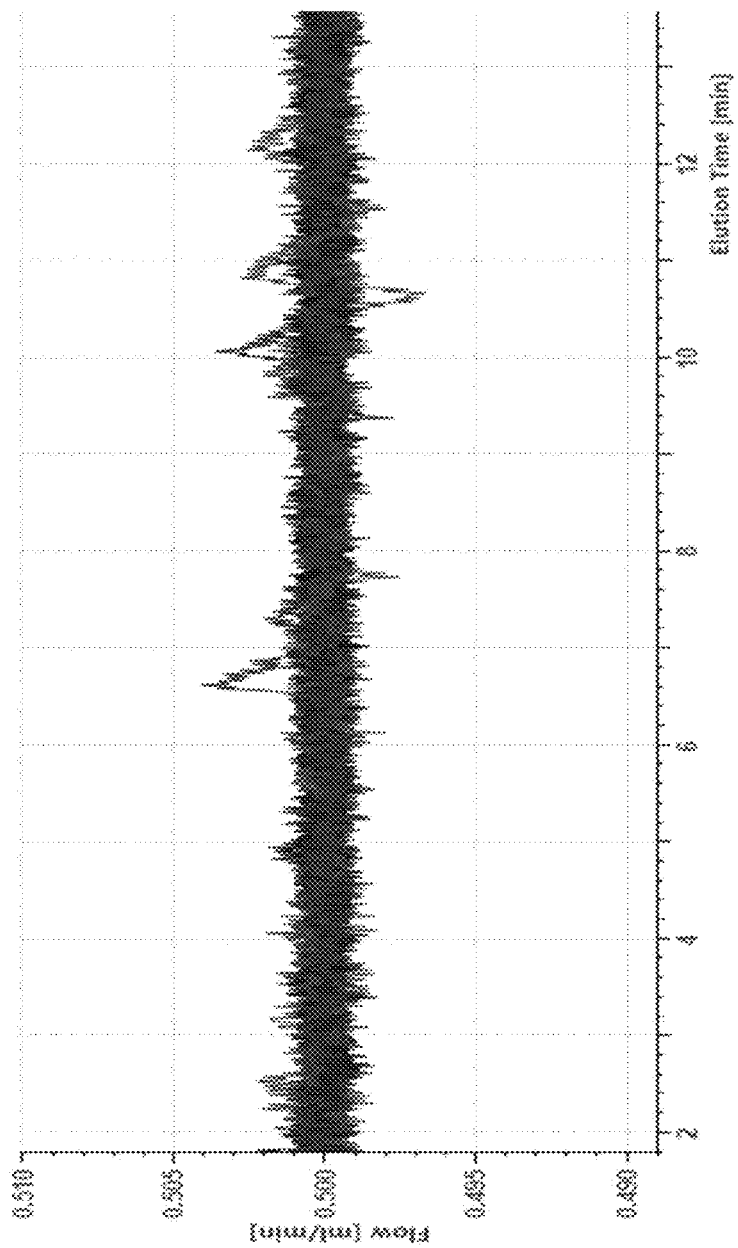
FIG. 7B depicts a graph in accordance with an embodiment.

For example, FIG. 4A, FIG. 4B, FIG. 5, FIG. 6A, FIG. 6B, FIG. 7A, and FIG. 7B depict the reproducibility of the control of the detector flow by the disclosed apparatus, method, and system. FIG. 5 demonstrates that the disclosed apparatus, method, and system can result in more accurate measurements of recovered mass (square/rectangle points) versus current systems (mass flow controller system) (diamond points.)

Computer System

In an exemplary embodiment, the computer system is a computer system 800 as shown in FIG. 8. Computer system 800 is only one example of a computer system and is not intended to suggest any limitation as to the scope of use or functionality of embodiments of the present invention. Regardless, computer system 800 is capable of being implemented to perform and/or performing any of the functionality/operations of the present invention.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/operations of embodiments of the invention.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present invention.

Computer system/server 812 may also communicate with one or more external devices 814 such as a keyboard, a pointing device, a display 824, one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:
   a detector flow meter,
      wherein an inlet of the detector flow meter is configured to be connected to an outlet of a detector port of a field flow fractionator,
      wherein an outlet of the detector flow meter is configured to be connected to an inlet of a detector chain comprising at least one detector,
      wherein the detector flow meter is configured to measure a detector flow from the field flow fractionator;
   a channel pressure meter,
      wherein an inlet of the channel pressure meter is configured to be connected to an outlet of a split port of the field flow fractionator,
      wherein the channel pressure meter is configured to measure a channel pressure of the field flow fractionator;
   at least one control valve,
      wherein an inlet of the at least one control valve is connected to an outlet of the channel pressure meter;
   wherein the detector flow meter is configured to set a channel pressure set point of the channel pressure meter to maintain the detector flow from the detector port at a particular flow rate; and
   wherein the channel pressure meter is configured to actuate the at least one control valve to maintain a channel pressure of the field flow fractionator at the channel pressure set point.

2. The apparatus of claim 1 wherein the at least one detector is one of a light scattering instrument, a viscometer, a refractometer, an ultraviolet-visible absorption detector, an infrared absorption detector, an evaporative light scattering detector, a Raman spectroscopy detector, an inductively coupled plasma mass spectrometry, a fluorescence detector, a conductivity detector, and a pH detector.

3. The apparatus of claim 2 wherein the light scattering instrument is one of a static light scattering instrument and a dynamic light scattering instrument.

4. The apparatus of claim 1 wherein the field flow fractionator (FFF) comprises at least one of an asymmetric flow FFF system, a gravitational FFF system, a centrifugal FFF system, a thermal-gradient FFF system, an electrical FFF system, a magnetic FFF system, a flow FFF system, a hollow fiber FFF system, and a split flow thin-cell fractionation system.

5. The apparatus of claim 1 wherein the particular flow rate is a constant flow rate.

6. The apparatus of claim 1 wherein the channel pressure meter is configured to actuate the at least one control valve to maintain the detector flow at the particular flow rate at a set time.

7. The apparatus of claim 6
   wherein the channel pressure meter is configured to actuate the at least one control valve towards a closed state to increase the channel pressure, in response to the detector flow being less than the particular flow rate, and
   wherein the channel pressure meter is configured to actuate the at least one control valve towards an open state to decrease the channel pressure, in response to the detector flow being greater than the particular flow rate.

8. The apparatus of claim 1
   wherein the channel pressure meter is configured to actuate the at least one control valve towards a closed state to increase the channel pressure, and
   wherein the channel pressure meter is configured to actuate the at least one control valve towards an open state to decrease the channel pressure.

9. The apparatus of claim 1 wherein an outlet of the detector flow meter is configured to be connected to a fraction collector.

10. A computer implemented method comprising:
    receiving, by a computer system, detector flow data from a detector flow meter,
       wherein the detector flow meter is configured to measure a detector flow from a field flow fractionator,
       wherein an inlet of the detector flow meter is configured to be connected to an outlet of a detector port of the field flow fractionator,
       wherein an outlet of the detector flow meter is configured to be connected to an inlet of a detector chain comprising at least one detector;

receiving, by the computer system, channel pressure data from a channel pressure meter,
wherein the channel pressure meter is configured to measure a channel pressure of the field flow fractionator,
wherein an inlet of the channel pressure meter is configured to be connected to an outlet of a split port of the field flow fractionator;
executing, by the computer system, in response to the received detector flow data, a set of logical operations setting, via the detector flow meter, a channel pressure set point of the channel pressure meter to maintain the detector flow from the detector port at a particular flow rate; and
executing, by the computer system, in response to the received channel pressure data, a set of logical operations actuating, via the channel pressure meter, at least one control valve to maintain a channel pressure of the field flow fractionator at the channel pressure set point,
wherein an inlet of the at least one control valve is connected to an outlet of the channel pressure meter.

11. The method of claim 10 wherein the at least one detector is one of a light scattering instrument, a viscometer, a refractometer, an ultraviolet-visible absorption detector, an infrared absorption detector, an evaporative light scattering detector, a Raman spectroscopy detector, an inductively coupled plasma mass spectrometry, a fluorescence detector, a conductivity detector, and a pH detector.

12. The method of claim 10 wherein the particular flow rate is a constant flow rate.

13. The method of claim 10 wherein the actuating comprises actuating, via the channel pressure meter, the at least one control valve to maintain the detector flow at the particular flow rate at a set time.

14. The method of claim 13
wherein the actuating comprises actuating, via the channel pressure meter, the at least one control valve towards a closed state to increase the channel pressure, in response to the detector flow being less than the particular flow rate, and
wherein the actuating comprises actuating, via the channel pressure meter, the at least one control valve towards an open state to decrease the channel pressure, in response to the detector flow being greater than the particular flow rate.

15. The method of claim 10
wherein the actuating comprises actuating, via the channel pressure meter, the at least one control valve towards a closed state to increase the channel pressure, and
wherein the actuating comprises actuating, via the channel pressure meter, the at least one control valve towards an open state to decrease the channel pressure.

16. A system comprising:
a memory; and
a processor in communication with the memory, the processor configured to perform a method comprising
receiving detector flow data from a detector flow meter,
wherein the detector flow meter is configured to measure a detector flow from a field flow fractionator,
wherein an inlet of the detector flow meter is configured to be connected to an outlet of a detector port of the field flow fractionator,
wherein an outlet of the detector flow meter is configured to be connected to an inlet of a detector chain comprising at least one detector,
receiving channel pressure data from a channel pressure meter,
wherein the channel pressure meter is configured to measure a channel pressure of the field flow fractionator,
wherein an inlet of the channel pressure meter is configured to be connected to an outlet of a split port of the field flow fractionator,
executing, in response to the received detector flow data, a set of logical operations setting, via the detector flow meter, a channel pressure set point of the channel pressure meter to maintain the detector flow from the detector port at a particular flow rate, and
executing, in response to the received channel pressure data, a set of logical operations actuating, via the channel pressure meter, at least one control valve to maintain a channel pressure of the field flow fractionator at the channel pressure set point,
wherein an inlet of the at least one control valve is connected to an outlet of the channel pressure meter.

17. The system of claim 16 wherein the particular flow rate is a constant flow rate.

18. The system of claim 16 wherein the actuating comprises actuating, via the channel pressure meter, the at least one control valve to maintain the detector flow at the particular flow rate at a set time.

19. The system of claim 18
wherein the actuating comprises actuating, via the channel pressure meter, the at least one control valve towards a closed state to increase the channel pressure, in response to the detector flow being less than the particular flow rate, and
wherein the actuating comprises actuating, via the channel pressure meter, the at least one control valve towards an open state to decrease the channel pressure, in response to the detector flow being greater than the particular flow rate.

20. The system of claim 16
wherein the actuating comprises actuating, via the channel pressure meter, the at least one control valve towards a closed state to increase the channel pressure, and
wherein the actuating comprises actuating, via the channel pressure meter, the at least one control valve towards an open state to decrease the channel pressure.

* * * * *